April 9, 1929.  J. C. MacILDOWIE  1,708,842
METHOD OF MAKING THICK SHEETS OF BONDED ASBESTOS
Filed Nov. 15, 1927
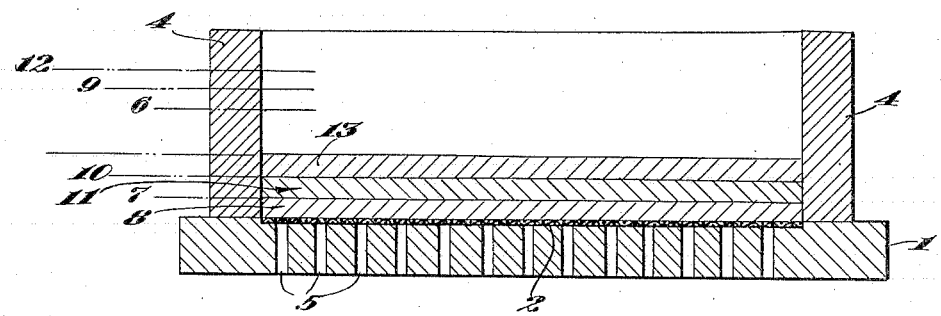
Inventor
John C. MacIldowie
by Roberts Cushman & Woodberry
Attys.

Patented Apr. 9, 1929.

1,708,842

UNITED STATES PATENT OFFICE.

JOHN C. MacILDOWIE, OF NASHUA, NEW HAMPSHIRE, ASSIGNOR TO ASBESTOS WOOD & SHINGLE CO., OF NASHUA, NEW HAMPSHIRE, A CORPORATION OF NEW HAMPSHIRE.

METHOD OF MAKING THICK SHEETS OF BONDED ASBESTOS.

Application filed November 15, 1927. Serial No. 233,380.

This invention relates to the formation of blocks, slabs and the like of fibre-concrete and has for its object the production of plates or slabs of greater thickness than has heretofore been found practicable to attempt, and relates particularly to the manufacture of such articles by filter compression from water suspensions of the solid constituents of the concrete such for instance as are exemplified by the product now commercially known as asbestos wood. The relative proportions of asbestos fibre and hydraulic cement which form the solid constituents of such a suspension may vary as also the proportion between the solid constituents taken as a whole and the water which is the vehicle of suspension; as a practical matter, however, there is a limit below which the water percentage may not safely be reduced for the reason that a suspension too rich in solids and too thick develops a tendency to form balls or lumps in the suspension which retain their individuality, present difficulties to the expression of water, and persist in the finally consolidated and set slab as serious defects in structure. Therefore with a filter press of any given depth capacity there is a limit to the thickness of the slab or sheet producible, imposed by this practical limit of the ratio between the water vehicle and the solids.

With the mixtures used in the manufacture of asbestos wood for instance, a ratio by way of water to solids less than 3 to 1 has been found by experience to be unsafe; if the ratio be diminished in value to 2 to 1 the production of a homogeneous product becomes improbable, although by accident a homogeneous product may result from the use of such a low ratio. On the other hand, the employment of a water suspension of the fibre and cement constituents of four parts water to one of solids is practically certain to yield uniform and satisfactory results.

By this method herein described slabs of such a fibre-concrete thoroughly integrated and free from lamination and far thicker than have heretofore been produced or producible in a press of any given depth capacity may be made without departing from the approved safe and preferable proportions of water and solids in the suspension of solids introduced into the receiving chamber of the press.

The drawing hereto annexed, which represents diagrammatically the upper and lower heads of a filter press, will assist in the explanation of my herein described method.

Referring to the drawing, 1 represents the lower press head in which the filter bed 2 is placed, 3 the upper head, and 4 the vertical walls of a rectangular chamber which receives the charge of water-suspended concrete ingredients from which the water is expressed in the usual manner through the filter bed 2 to be discharged from suitably arranged channels 5.

Assuming a water suspension of the solid constituents of a fibre-concrete in which the ratio of water to solid is 4 to 1; the press bed illustrated will be first charged with a mass of such suspension which fills the receiving chamber to the level indicated by the dotted line 6. Should the charge thus introduced be subjected to pressure, the water of suspension expressed therefrom, and the pressure accumulated to the point required to condense thoroughly and finally the solid constituents with only such water remaining associated therewith as will resist expression from the solids by further increase of pressure, the thickness of the completely condensed mass will be substantially less than that represented by the material indicated in the drawing lying between the filter bed 2 and the line 7. In practice this complete condensation pressure approximates 4000 pounds to the square inch. Instead of proceeding to such complete condensation, the press heads are made to approach, expressing the water of suspension from the solids and through the filter bed and by manipulation of the controls of the press this pressure is not allowed to exceed a value of the order of 100 pounds to the square inch, and when the gages show that further approach of the press heads to each other will raise the pressure from such predetermined moderate and safe value the heads are separated. The mass thus produced and lying upon the filter bed 2, while condensed into a slab or cake is nevertheless soft, yielding to pressure of the fingers. Enough water remains associated with the solid constituents to hold them much further apart than would have been the case if the complete consolidating or condensing pressure had been applied. This lightly pressed or semi-condensed slab 8 is in itself a porous filter through which water can be driven under pressure. Indeed this condition is demonstrated by the fact that if pressure were to be raised from the moderate value, at which increase of pressure was arrested, water would continue to be expressed from the mass, filtering down through until the ultimate pressure was reached.

Then a second charge of a similar water suspension of concrete materials is introduced into the receiving chamber, filling it this time about to the level marked 9; the press heads are made to approach and the water of this suspension is filtered through the underlying body 8 and the expression continued until the second charge is compressed to a depth indicated by the line 10. During the compression of this second charge 11 the water of suspension passing into and through the previously semi-condensed charge 8 carries with it into the interstices of the mass 8 some of the fibre and cement contained in the second charge, so that when the pressure on charge 11 is arrested, say at a value of about 100 pounds to the square inch and at a time when the increase of pressure shows its tendency toward a final rise, the two successively introduced charges have become practically integrated, the original upper surface at 7 of the lower semi-condensed charge has disappeared, and the body of one has merged in the body of the other. If a greater thickness of product is desired a third charge of a water suspension of fibre-concrete materials is introduced into the press chamber and will fill it about to the level marked 12. The press is then operated and the water of this third suspension is expressed from it through the underlying filter mass 8, 11, and the fibre and cement constituents of the third charge 13 are carried into the interstices of the portion 11 integrating the materials of the third charge with those of the second. Assuming now that the desired thickness of the product has been reached, the pressure on the three accumulated successive charges is made to rise until it reaches the ultimate condensing pressure which is about 4000 pounds to the square inch. During this stage the residual water contained in the material 8—11—13 will be squeezed out of it and there will remain with the solid constituents the non-expressible water which eventually functions in the final setting of the concrete mass. The reduction in thickness during the application of increasing to final pressure will not be very great. It has been found advisable in practice to hold the final pressure of say 4000 pounds to the square inch for a short time after it has been attained, then to release it, without however retracting one press head from the other, allowing the pressure to fall to say 300 or 400 pounds to the square inch, and after this release then to accumulate the pressure again to the high limit of about 4000 pounds. It has been discovered by experience that material which apparently is resisting further condensation at the first application of 4000 pound pressure will after such release and reapplication undergo further, though slight, condensation which considerably enhances the density and final strength of the material.

When the material has thus been accumulated to the desired thickness and has been finally condensed, the press heads are withdrawn from each other, the block made up of the successive charges 8—11—13 clinging to the smooth imperforate surface of the head 3 from which it can be easily detached and dropped upon a suitable rack by merely loosening one edge of the material from the press head. After being withdrawn from the press the material is stacked with other similar slabs and the concrete is allowed to set.

It will now be obvious that in a press of any given depth capacity a thoroughly homogeneous, non-laminated slab of the character described may be made of much greater thickness than would otherwise be possible.

Claims:

1. Method of forming fibre-concrete, characterized by partially condensing the solid constituents of a mass of fibre-concrete, by expression of water from a water suspension thereof, then condensing a mass of similar water suspension by expressing water therefrom through the formerly partially condensed mass to integrate the two said masses, thereafter applying pressure to the thus united masses to effect maximum condensation by expression therefrom of residual water of suspension, and allowing the product to set.

2. Method of forming fibre-concrete, characterized by partial condensation of the solid constituents of masses of fibre-concrete by expression of water from a water suspension thereof, in successive superposition, expressing the water from each suspension through the partially condensed solids previously thus treated to integrate the solid constituents of successively pressed masses, applying pressure to thus united successively partially compressed masses to effect maximum condensation of the solids by expression therefrom of residual water of suspension, and allowing the product to set.

3. Method of forming fibre-concrete, characterized by partially condensing the solid constituents of a mass of fibre-concrete by expression of water from a water suspension thereof, then condensing a mass of similar water suspension by expressing water therefrom through the formerly partially condensed mass to integrate the two masses, applying an increased pressure to the thus integrated masses, releasing such pressure, and then applying a final pressure thereto, to effect the maximum condensation required by expression therefrom of residual water of suspension.

4. Method of forming fibre-concrete, characterized by partially condensing the solid constituents of a mass of fibre-concrete by expression of water from a water suspension thereof under pressure, releasing such pressure without permitting expansion of the condensed mass, and applying an increased pressure thereto, to effect the maximum condensation required by expression therefrom of residual water of suspension.

Signed by me at Nashua, New Hampshire, this twelfth day of November, 1927.

JOHN C. MacILDOWIE.